(12) United States Patent
Yamamoto et al.

(10) Patent No.: US 6,208,475 B1
(45) Date of Patent: Mar. 27, 2001

(54) OPTICAL-MEMBER INSPECTION APPARATUS AND HOLDER FOR INSPECTION TARGET MEMBER

(75) Inventors: Kiyoshi Yamamoto, Tokyo; Masayuki Sugiura; Taichi Nakanishi, both of Saitama-ken; Takashi Tohara, Tochigi-ken; Masato Hara, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,664

(22) Filed: Jun. 16, 1999

(30) Foreign Application Priority Data

Jun. 17, 1998 (JP) .................................................. 10-170355
Jun. 29, 1998 (JP) .................................................. 10-183043

(51) Int. Cl.⁷ ...................................................... G02B 7/02
(52) U.S. Cl. ...................... 359/808; 356/124; 356/239.2; 359/811
(58) Field of Search ................................. 359/808, 811, 359/818; 356/124, 239.2

(56) References Cited

U.S. PATENT DOCUMENTS

| 5,168,405 | * | 12/1992 | Feinbloom | 359/802 |
| 5,396,487 | * | 3/1995 | Abe et al. | 359/819 |
| 5,781,351 | * | 7/1998 | Murakami et al. | 359/808 |
| 5,782,825 | * | 7/1998 | Anderson | 606/15 |
| 5,995,213 | * | 11/1999 | Davis et al. | 356/124 |

FOREIGN PATENT DOCUMENTS 10-246706   9/1998  (JP) .

* cited by examiner

*Primary Examiner*—Georgia Epps
*Assistant Examiner*—Tim Thompson
(74) *Attorney, Agent, or Firm*—Greenblum & Bernstein P.L.C.

(57) ABSTRACT

A holder is constructed of a cylindrical member made of a metal and an inward flange member made of a diffusion transparent member. The inside of the cylindrical member is sectioned into a tapered area whose inside diameter decreases downward, and a small-diameter cylindrical area and a large-diameter cylindrical area. The inward flange member is bonded to the bottom end of the small-diameter cylindrical area.

15 Claims, 18 Drawing Sheets

OPTICAL-MEMBER INSPECTION APPARATUS AND HOLDER FOR INSPECTION TARGET MEMBER

BACKGROUND OF THE INVENTION

1. Field of the Invention

The present invention relates to an optical member inspection apparatus for detecting defective factors of an optical member such as a lens, etc.

2. Description of the Related Art

An optical member such as a lens or a prism is designed so that a luminous flux incoming into the optical member is regularly refracted, advanced in parallel, converged onto a point or line, or diverged. However, if the optical member contains a foreign substance such as yarn waste (so-called fuss) or the like which had been immixed while the optical member is formed, or if the surface of the optical member is scratched during handling thereof by an operator after it had been formed, a luminous flux incoming into the optical member is disturbed and thereby, a desired optical property cannot be obtained.

Therefore, various optical-member inspection apparatuses detecting defective factors of an optical member to automatically decide the quality of an optical member have been proposed so far. For example, Japanese Patent Application Laid-Open No. 10-246706 discloses an optical member inspection apparatus which outputs image data for deciding the quality of an inspection target optical member, by using an imaging optical system and a line sensor arranged on the optical axis of the optical member, and thereby picking up the optical member while rotating the optical member about its optical axis. In a picture shown by the image data obtained by the optical member inspection apparatus, defective factors of the optical member are imaged as bright images in a dark background corresponding to the normal region.

In this case, the inspection target optical member is picked up from a position on its optical axis. Therefore, the lateral face of the optical member (that is, "edge" as for a lens) is imaged as a bright image (which is annular image as for a lens, which is referred to as "edge image") inside of the outer border of the optical member in the picture shown by the image data which is obtained by picking up the optical member. Particularly, in the case that a negative lens having a thick edge (such as a negative meniscus lens) is picked up from the concave side, the width of the edge image increases.

An image processor of the optical-member inspection apparatus distinguishes a region corresponding to the optical member within image data, based on the position of a lateral image in the image data and cuts out only region inside the lateral image as an object region of image-processing which is called "inspection target region" herein after.

As a holder for holding an inspection target optical member in an optical-member inspection apparatus, an annular holder of which internal surface is formed with inward flange or spot facing for supporting the entire outer margin of the inspection target optical member is often adopted so as to be able to securely hold the inspection target optical member regardless of its edge thickness. FIG. 17 is a sectional view showing such a conventional holder. The conventional holder shown in FIG. 17 is made of a cylindrical member 100. On the inner edge of the opening at the upper end 101 of the cylindrical member 100, a spot facing portion 102 which is lowered by one step is formed so as to support the outer margin of the optical member.

However, when the outer margin of the inspection target optical member is mounted on the inward flange or spot facing of the holder having the above shape, illumination light is shaded by the inward flange or spot facing and thereby, the illumination light does not reach the lateral face of the inspection target optical member. As a result, no rays come into an image pickup device because rays are reflected on the lateral face and therefore, a lateral image is not formed in a picture shown by image data. If the lateral image is not imaged in the picture shown by the image data, it is impossible to securely identify a region corresponding to the inspection target optical member in the image data. That bring a mistake that unnecessary noises are contained in inspection results due to regions other than the proper region corresponding to the inspection target optical member being included in an inspection target region, or a mistake that defective factor is overlooked by excluding a part or the whole of the proper region corresponding to the inspection target optical member from the inspection target region. If the above mistakes occur, it is impossible to accurately decide the quality of the inspection target optical member. In case that only one holder having specific diameter for one size of optical member is used, the above problem is not serious because the range of proper region can be preset. However, in case that plurality of holders respectively having various diameters are exchangeably used (that is, in case that optical members having various diameters are inspected), the above problem becomes very serious because the range of inspection target region must be actively set in accordance with acquired image data itself.

Furthermore, according to the conventional holder shown in FIG. 17, an object serving as an aim for lowering an inspection target optical member to set it to a holder is only the spot facing portion 102 itself. Therefore, to set the inspection target optical member to the holder, an operator is liable to carelessly hit the inspection target optical member against the upper end 101 of the cylindrical member 100 to scratch a surface of the inspection target optical member because the operator does not know a right course of letdown of the inspection target optical member. Otherwise, the operator may waste a lot of time by carefully performing operations so as not to scratch the surface of the inspection target optical member. Moreover, when the width of the lateral face (edge as for a lens) of an inspection target optical member is narrow, the lateral face (edge) completely enters the spot facing 102. In this case, the operator cannot pick up the optical member in the spot facing 102 with his or her fingers. Therefore, the operator may scratch the surface of the inspection target optical member by a jig or waste the working time, with intent to take out the optical member from the spot facing 102 by using the jig.

SUMMARY OF THE INVENTION

It is the first object of the present invention to provide a holder for an inspection target optical member and an optical-member inspection apparatus capable of securely holding the inspection target optical member regardless of the thickness of the lateral face of the inspection target optical member and securely forming a image showing border of the inspection target optical member in a picture shown by the image data.

It is the second object of the present invention to provide a holder for an inspection target optical member and an optical member inspection apparatus having an aim for lowering the inspection target optical member to set it to a predetermined position without the inspection target optical member colliding against the end of the holder and allowing an operator to quickly and securely set or remove the inspection target optical member with his or her fingers regardless of the thickness of the lateral face of the inspection target optical member.

A holder according to the first aspect of the present invention is a holder for holding an outer margin of an optical member, which comprises an enclosure portion having an inside width larger than outer width of the optical member and a protrusion made of a diffusion transparent member to restrict movement of the optical member in the enclosure portion by contacting the outer margin of the optical member.

A holder according to the second aspect of the present invention is configured so that a protrusion protrudes from inside of the enclosure portion.

A holder according to the third aspect of the present invention is configured so that an enclosure portion is made of an opaque material.

A holder according to the fourth aspect of the present invention is configured so that inside of the enclosure portion forms a cylindrical face and a protrusion protrudes from the inside of the enclosure portion like a circular arc.

A holder according to the fifth aspect of the present invention is configured so that an enclosure portion is a cylindrical member.

A holder according to the sixth aspect of the present invention is configured so that inside of an enclosure portion has a shape in which a portion having a large inside diameter and a portion having a small inside diameter are alternately repeated along circumferential direction and a plurality of protrusion protrude from small-inside diameter portions of the inside of the enclosure portion.

An optical member inspection apparatus according to the seventh aspect of the present invention is an optical-member inspection apparatus for obtaining image data used for inspections by applying illumination light to an optical member from one side thereof and photographing the optical member from the other side, which has a holder comprises an enclosure portion having an inside width larger than outer width of the optical member and a protrusion to restrict movement of the optical member in the enclosure portion by contacting the outer margin of the optical member and made of a diffusion transparent member.

An optical-member inspection apparatus according to the eighth aspect of the present invention is configured so that the protrusion protrudes from inside of the enclosure portion.

An optical-member inspection apparatus according to the ninth aspect of the present invention is configured so that the enclosure portion is made of an opaque material.

An optical-member inspection apparatus according to the tenth aspect of the present invention is configured so that inside of an enclosure portion forms a cylindrical face and the protrusion protrudes from the inside of the enclosure portion like a circular arc.

According to present invention in those aspect, an optical member is positioned by the inside of the enclosure portion and the protrusion. Therefore, the holder can securely hold the optical member regardless of the thickness of the lateral face of the optical member. When illumination light is applied to the protrusion of the holder, the illumination light diffuses on the surface or inside of the protrusion. Therefore, the protrusion is picked up as a bright portion due to the diffused light. Because the protrusion contacts the outer margin of the optical member, the bright portion overlaps with the outer margin of the optical member. Therefore, it is possible to specify the outer margin of the optical member in a picture of the optical member shown by the image data, based on the bright portion.

As for the present invention, a system for photographing the optical member is optional. However, the present invention is particularly effective for a system in which the normal portion of the inspection target optical member is darkly photographed. As the above system, there is a system for photographing a defect on the surface of the optical member as a bright image by applying illumination light from outside of the photographing range to the optical member diagonally to the photographing optical axis. The illumination light may be applied from the side of one face contacting a protrusion or from the side of another face opposite to the one face.

Entire of the holder may be made of a diffusion transparent plate or only the protrusion may be constituted of a diffusion transparent plate. The protrusion may protrude from the inside of the enclosure portion or from the end surface of the enclosure portion. The protrusion may be configured so as to contact the entire outer margin of the optical member or so as to contact only a part of the outer margin.

A holder according to the eleventh aspect of the present invention is a holder for holding an outer margin of an optical member, which comprises a base portion having shape of a frame and a plurality of optical-member holding portions provided for the base portion separately from each other so as to enclose a space for storing the optical member formed in the base portion. Each of the optical-member holding portions has a receiving face on which the outer margin of the optical member is mounted and a restriction wall to restrict movement of the optical member mounted on the receiving face by contacting the outer margin of the optical member.

According to present invention in this aspect, if an operator inserts his or her fingers holding the optical member into spaces between optical-member holding portions adjacent to each other, the lateral face of the optical member is adjusted to the restriction wall of each optical-member holding portion to a certain extent. Therefore, the operator lowers the optical member toward the receiving face with keeping above state, then the optical member is set in the space enclosed by the restriction wall of each optical-member holding portion and mounted on the receiving face without colliding against the upper end of each optical-member holding portion. When removing the optical member from the holder, the operator can hold the lateral face of the optical member by inserting his or her fingers into the spaces between the optical-member holding portions adjacent to each other. Therefore, the probability that the optical member is scratched is lowered while the optical member is set to or removed from the holder regardless of the thickness of the lateral face of the optical member.

A holder according to the twelfth aspect of the present invention is configured so that a slope tilted toward outside as it goes away from the receiving face is formed on each optical-member holding portion, which is immediate the restriction wall at the side separate from the receiving face.

According to present invention in this aspect, even if the lateral face of the optical member is shifted from the restriction wall of each optical-member holding portion when the operator inserts his or her fingers holding the optical member into the spaces between optical-member holding portions adjacent to each other, the optical member is guided by the slope because the outer margin of the optical member contacts the slope of each optical-member holding portion, set in the space enclosed by the restriction wall of each optical-member holding portion and mounted on the receiving face.

A holder according to the thirteenth aspect of the present invention is configured so that the restriction wall of each optical-member holding portion is formed as a cylindrical face having a common center axis, the inner edge of the receiving face of each optical-member holding portion is formed like a circular arc of which center of curvature is on the common center axis, and the slope of each optical-member holding portion is formed as a tapered face of which center of vertex is on the common center axis.

A holder according to the fourteenth aspect of the present invention is configured so that the base portion is formed into an annular shape about the common center axis.

An optical-member inspection apparatus according to the fifteenth aspect of the present invention is an optical-member inspection apparatus for obtaining image data used for inspections by applying illumination light to an optical member from one side thereof and photographing the same optical member from the other side, which has a holder comprises a base portion having shape of a frame and a plurality of optical-member holding portions provided for the base portion separately from each other so as to enclose a space for storing the optical member formed in the base portion. Each optical-member holding portion has a receiving face on which the outer margin of the optical member is mounted and a restriction wall contacting the lateral face of the optical member mounted on the receiving face to restrict the movement of the optical member.

BRIEF DESCRIPTION OF THE DRAWINGS

The invention will be described below in detail with reference to the accompanying drawings, in which.

DESCRIPTION OF THE PREFERRED EMBODIMENTS

The present disclosure relates to subject matter contained in Japanese Patent Applications No. 10-170355 (filed on Jun. 17, 1998) and No. 10-183043 (filed on Jun. 29, 1998) which is expressly incorporated herein by reference in its entirety.

First Embodiment

<Structure of optical-member inspection apparatus>

Figure 1:
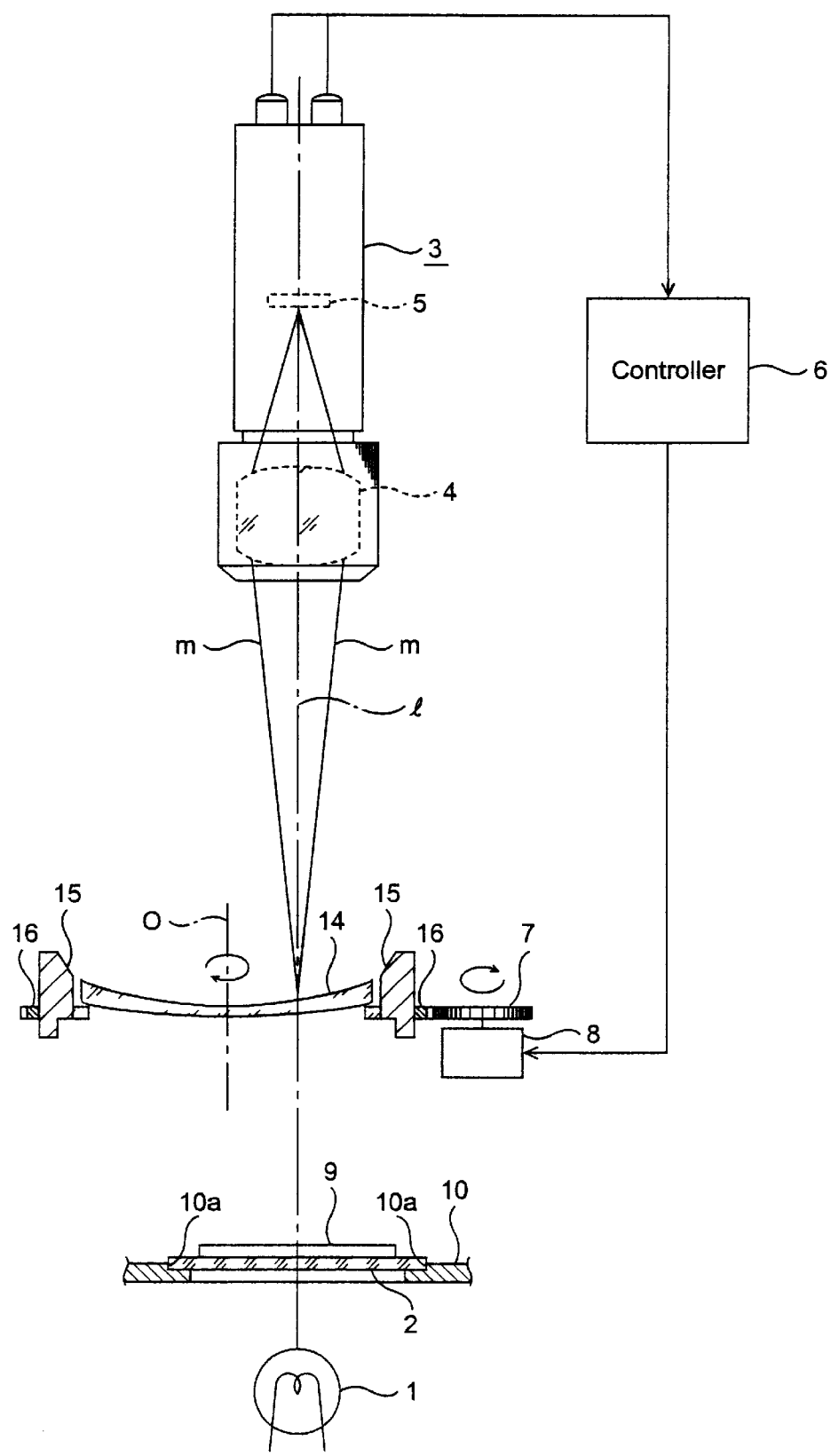
FIG. 1 is a sectional view schematically showing an optical-member inspection apparatus according to a first embodiment of the present invention.

A schematic structure of an optical-member inspection apparatus according to the first embodiment of the present invention is shown in FIG. 1 that is a sectional view. As shown in FIG. 1, the optical-member inspection apparatus comprises an illumination lamp 1, a diffusion plate 2 and an image pickup device 3 which are aligned along a common optical axis 1.

The image pickup device 3 comprises an imaging lens 4 that is a positive lens system and a CCD line sensor 5 which is configured of a plurality of pixels arranged along one direction to pick up an image formed by the light converged by the imaging lens 4. In FIG. 1, the CCD line sensor 5 is set such that row of its pixels is oriented to horizontal direction on FIG. 1. Moreover, the row of pixels of the CCD line sensor 5 vertically intersects the optical axis 1 of the imaging lens 4 at its center. Furthermore, the imaging lens 4 is held in the image pickup device 3 so that it can freely reciprocate for focussing with respect to the CCD line sensor 5. Further, the image pickup device 3 itself is mounted on an unillustrated frame of the optical-member inspection apparatus so as to be able to reciprocate along the optical axis 1. The CCD line sensor 5 captures a line image, self-scans each pixel in order of arrangement thereof, and successively outputs electric charges accumulated in the pixels, repeatedly at intervals of predetermined time (time in which electric charges are properly accumulated in each pixel). The electric charges thus output from the CCD line sensor 5 undergo predetermined amplification and A/D conversion and then, are input to a controller 6 as image data constituted of luminance signals for one line.

Figure 2:
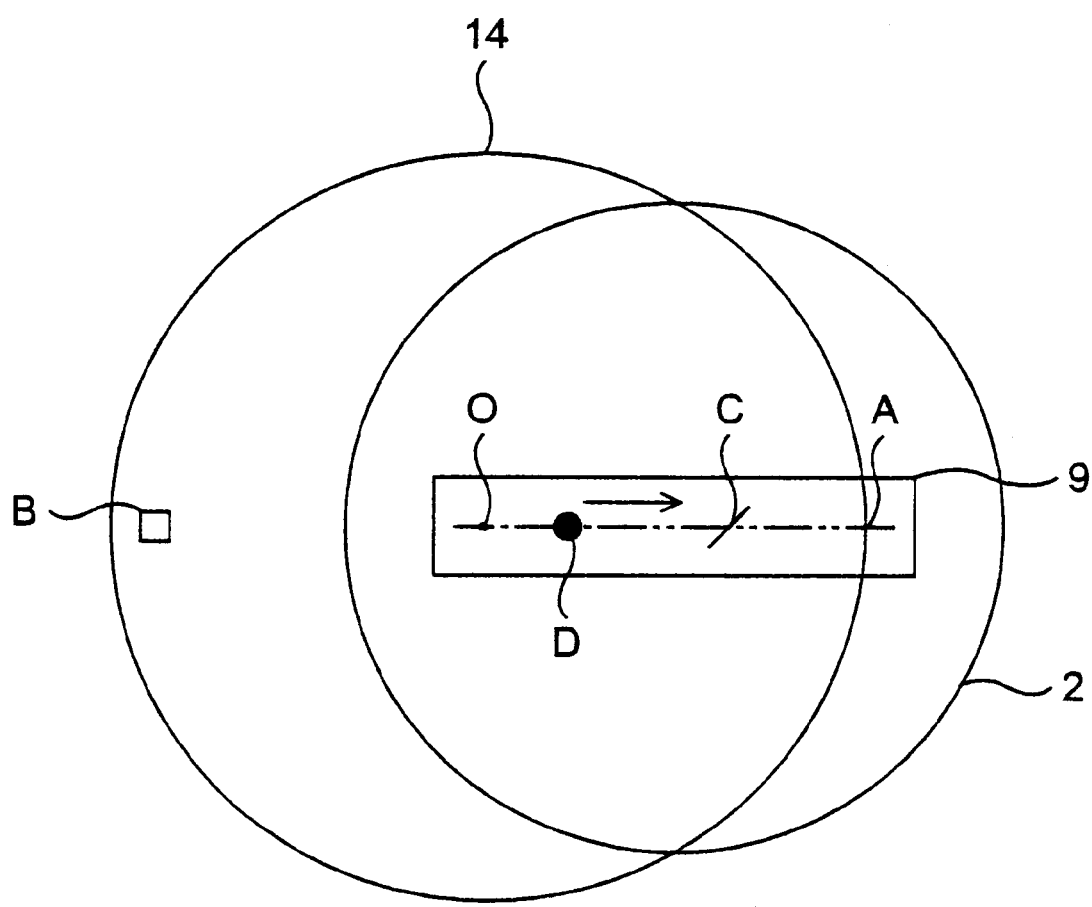
FIG. 2 is a plane view showing an inspection target optical member from an image pickup device.

An inspection target optical member 14 is a circular lens shown in FIG. 2 which is a plane view of the inspection target optical member 14 from the image pickup device 3. The inspection target optical member 14 is held by a holder 15 set to an unillustrated frame of the optical-member inspection apparatus so that the surface of the member 14 adjacent to the imaging lens 4 becomes conjugate with the imaging plane of the CCD line sensor 5 with respect to the imaging lens 4. The holder 15 has a generally annular shape about the center axis O which is offset in parallel with the optical axis 1 of the imaging lens 4 to hold the entire outer margin of the inspection target optical member 14. The concrete shape of the holder 15 is more minutely described below by referring to the plane view of FIG. 3 and the longitudinal sectional view of FIG. 4.

Figure 3:
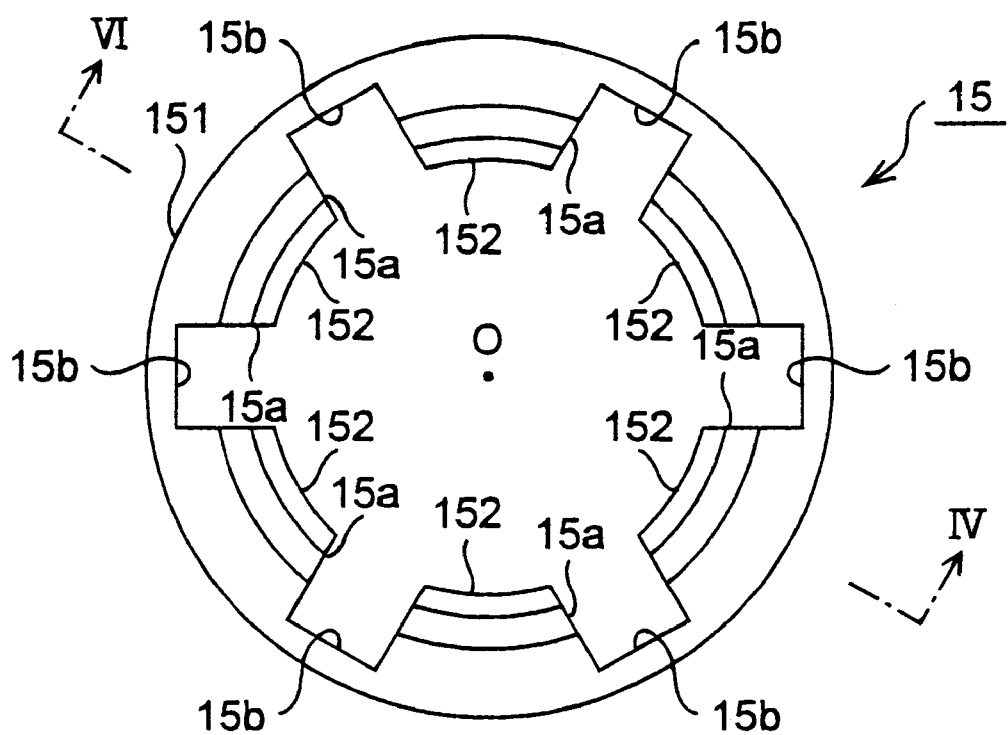
FIG. 3 is a plane view of a holder.
Figure 4:
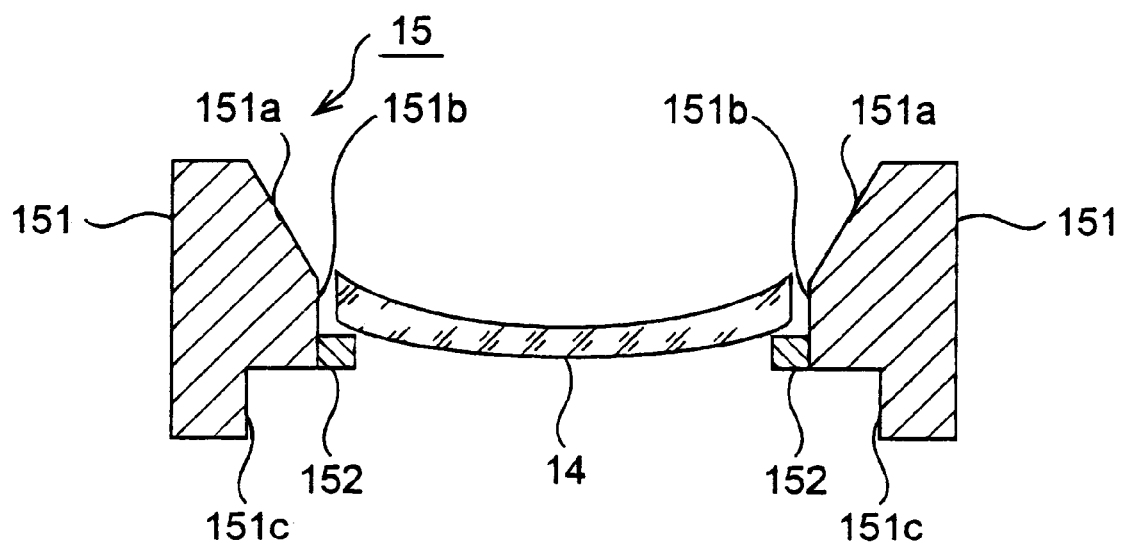
FIG. 4 is a longitudinal sectional view of the holder of FIG. 3, taken along the line IV—IV on FIG. 3.

As shown in FIGS. 3 and 4, the holder 15 is constructed of a cylindrical member 151 (that is, an enclosure portion)

made of an opaque material (that is, metal) substantially having a cylindrical shape and a plurality of inward flange members 152 (that is, protrusion) protruding from the inside of the cylindrical member 151 toward the center axis thereof.

Figure 14:
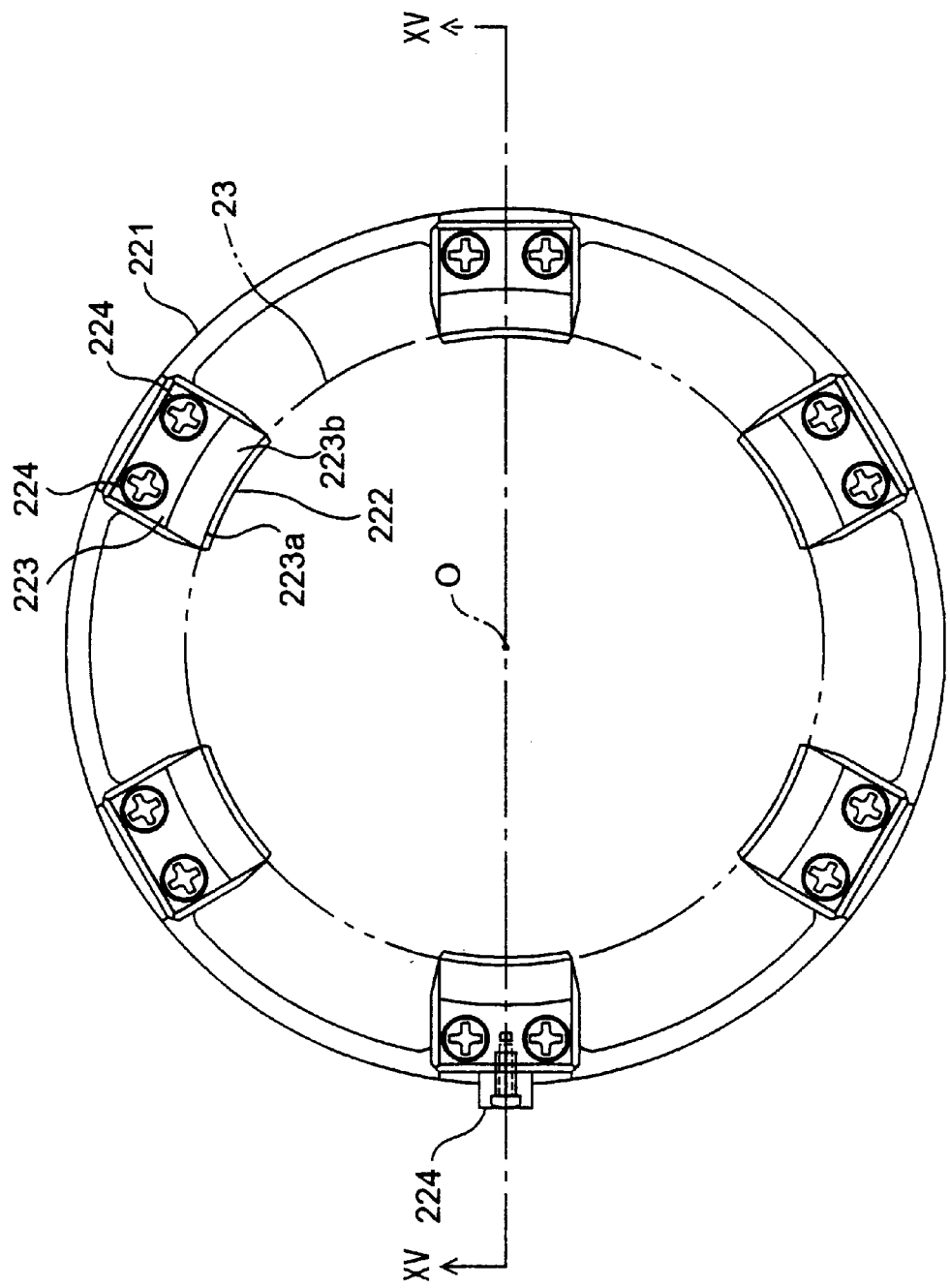
FIG. 14 is a plane view of a holder.

The outer periphery of the cylindrical member 151 is formed into a surface of cylinder and the inside face of the cylindrical member 151 is sectioned into a tapered area 151a narrowing downward, a small-diameter cylindrical area 151b continued to the most narrowed portion of the tapered area 151a and having same diameter as the tapered area 151a, and a large diameter cylindrical area 151c having a diameter larger than that of the small-diameter cylindrical area 151b so as to form a step with the small-diameter cylindrical area 151b, from the top of FIG. 14 in order. Moreover, the inside diameter of the small-diameter cylindrical area 151b is larger than the outside diameter of the inspection target optical member 14.

Each inward flange member 152 has a shape whose longitudinal section is rectangular and whose plane is substantially circular arc. Each of the inward flange members 152 is bonded to the bottom end of the small-diameter cylindrical area 151b so that the bottom face (that is, face opposite to the face on which the inspection target optical member 14 is mounted) is flushed with the interface between the small-diameter cylindrical area 151b and the large-diameter cylindrical area 151c. The axial length along vertical direction in FIG. 4 of each inward flange member 152 is approx. ⅖ of that of the small-diameter cylindrical area 151b. Therefore, the upper face (that is, face on which the inspection target optical member 14 is mounted) of each inward flange member 152 and the small-diameter cylindrical area 151b perpendicularly intersect each other at the longitudinal cross section. The inside diameter of each inward flange member 152 is smaller than the outside diameter of the inspection target optical member 14. Therefore, each inward flange member 152 contacts the outer margin of the inspection target optical member 14 at its upper face to restrict downward movement of the inspection target optical member 14 along the optical-axis.

Each inward flange member 152 is made from a diffusion transparent member. As the material of the inward flange member 152, one of a transparent member such as glass whose surface is polished and a transparent member such as a synthetic resin containing bubbles or fillers for diffusing light may be used.

When viewing the holder 15 consisting of the cylindrical member 151 and the inward flange member 152 from the upper side thereof (that is, from the image pickup device 3), it is found that six notches 15a are formed at equal-angle interval (that is, at interval of 60° about the center axis O of the holder 15) outward from the inside face of the holder 15, as shown in FIG. 3. The plane shape of each notch 15a is rectangular and the deepest portion 15b of each notch 15a reaches a position outside the upper end of the tapered area 151a and outside the large-diameter cylindrical area 151c. Moreover, the width of each notch 15a has a dimension such that operator's fingers holding the inspection target optical member 14 can pass through the notches 15a.

The holder 15 constructed as describe above is rotatable about its center axis O in a plane perpendicular to the optical axis 1. An annular gear 16 is fitted to the outer periphery of the holder 15. The annular gear 16 engages with a pinion gear 7 fixed to the driving shaft of a driving motor 8. Therefore, when the driving motor 8 rotates the driving shaft, the holder 15 is rotated through both the gears 7 and 16 and the inspection target optical member 14 held by the holder 15 is rotated in a plane perpendicular to the optical axis 1.

The magnification of the imaging lens 4 (that is, the position of the image pickup device 3 and that of the imaging lens 4 with respect to the CCD line sensor 5) is adjusted so as that image of the region between the center axis O and the outer margin of the inspection target optical member 14 on the imaging plane of the CCD line sensor 5. In FIG. 2, a liner region which can be picked up at once by the CCD line sensor 5 is shown by a two-dot chain line, which is called "imaging target region" hereinafter.

Figure 6:
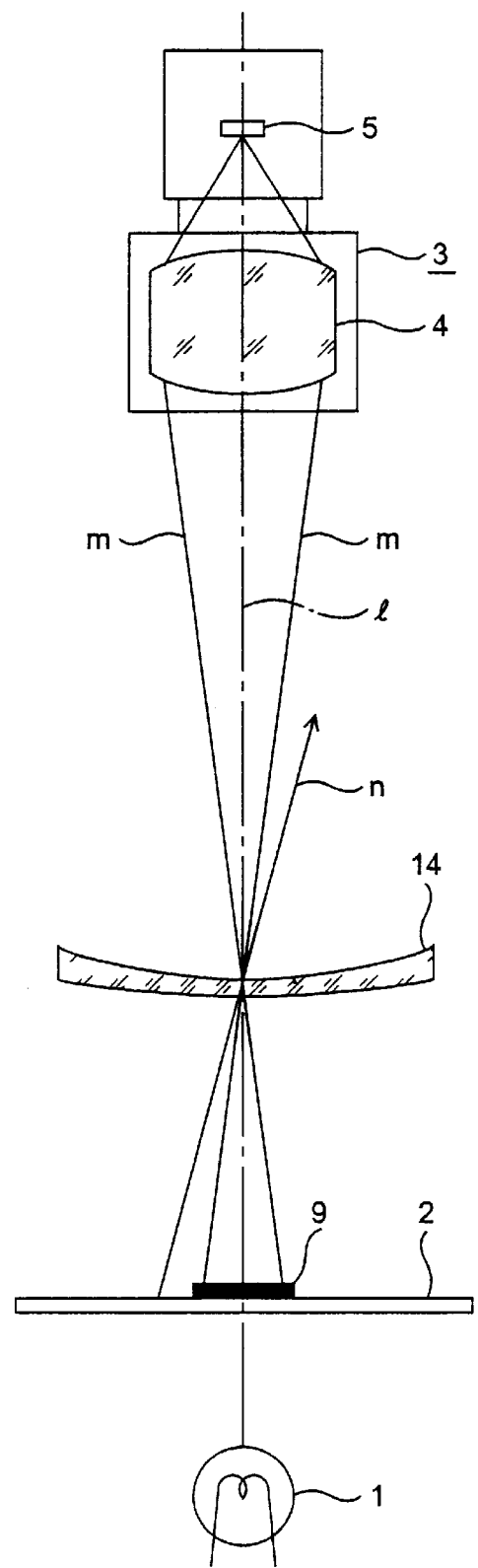
FIG. 6 is an illustration showing advance of light in a state that an inspection target optical member does not have any defective factor.

An illumination lamp 1 is an incandescent lamp for emitting illumination light (that is, white light), which is fixed to the unillustrated frame of the optical-member inspection apparatus. The diffusion plate 2 set between the illumination lamp 1 and the inspection target optical member 14 has a discoid shape having a diameter equal to or larger than the radius of the inspection target optical member 14 as shown in FIG. 2 and its surface is frosted as a rough surface. Therefore, the diffusion plate 2 receives the illumination light emitted from the illumination lamp 1 on its rear surface and diffuses the light toward the inspection target optical member 14. The diffusion plate 2 is fitted into a circular opening 10a formed in a holding plate 10 fixed to the unillustrated frame of the optical-member inspection apparatus. Thus fitted into the opening 10a, the diffusion plate 2 perpendicularly intersects the optical axis 1 of the imaging lens 4 at its center. A light-shielding plate 9 having a strip-like shape is stuck onto the surface of the diffusion plate 2 so that its longitudinal direction is parallel with the direction of the pixel string of the CCD line sensor 5. The center of the light-shielding plate 9 coincides with the optical axis 1 of the imaging lens 4. The overall length of the light-shielding plate 9 is longer than the radius of the inspection target optical member 14. Furthermore, as shown in FIG. 2, when viewing the light-shielding plate 9 from the direction of the image pickup device 3, the opposite ends of the light-shielding plate 9 extends beyond the radius of the inspection target optical member 14. Furthermore, the width of the light shielding plate 9 is larger than the interval between marginal rays m and m of light which may be incident upon each pixel of the CCD line sensor 5 as shown in FIG. 6 which is a sectional view of an optical-member inspection apparatus in the direction perpendicular to the pixel string of the CCD line sensor 5, in which view optical axes of imaging lens 4 and optical member 14 are aligned.

Figure 5:
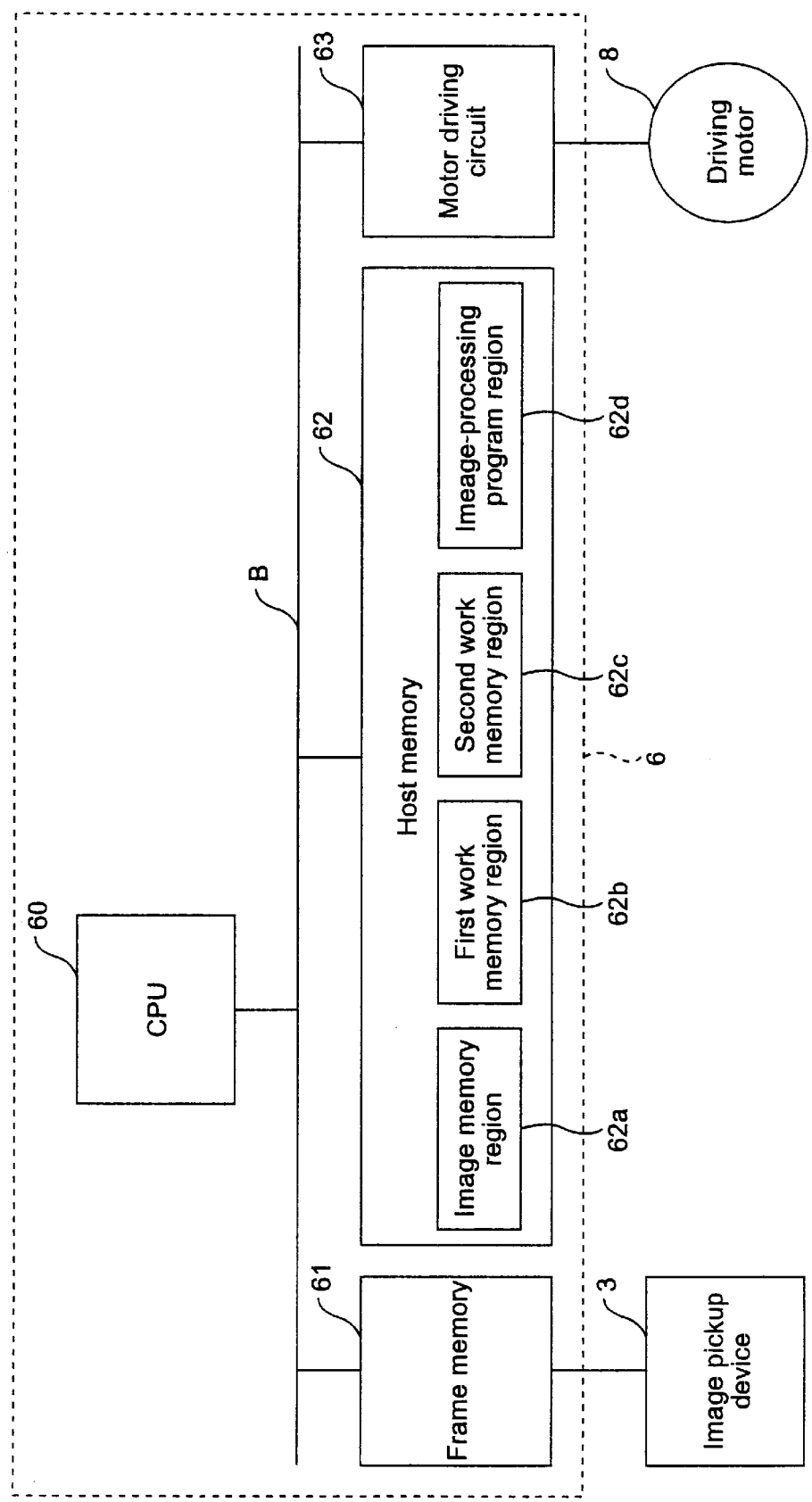
FIG. 5 is a block diagram showing the internal circuit configuration of a controller.

The controller 6 is a processor for deciding whether the inspection target optical member 14 is a non-defective or defective product in accordance with the image data supplied from the image pickup device 3 and supplying a driving current to the driving motor 8. FIG. 5 is a block diagram showing the internal circuit configuration of the controller 6. As shown in FIG. 5, the controller 6 is constructed of a CPU 60, a frame memory 61, a host memory 62, and a motor driving circuit 63 connected to each other through a bus B. The frame memory 61 is a buffer in which the image-data supplied from the image pickup device 3 is written. The host memory 62 includes an image memory region 62a, a first work memory region 62b, a second work memory region 62c, and an image-processing-program storage region 62d. The image data written in the frame memory 61 is transferred to each line of the image memory region 62a sequentially from the head every interval of predetermined time. The first work memory region 62b and second work memory region 62c are those on which image processing is executed by the CPU 60. The image-processing program storage region 62d serves as a computer readable medium for storing an image-processing program to be executed by the CPU 60. The motor driving circuit 63 supplies a driving current to the driving motor 8 for driving the driving motor 8 so that the holder 15 and inspection target optical member 14 rotate at a constant speed counterclockwise viewed from the image pickup device 3.

The CPU 60 is a computer for controlling the whole of the controller 6. More minutely, the CPU 60 executes the image-processing program stored in the image-processing-program storage region 62d of the host memory 62 and regularly transferring the image data written in the frame memory 61 to the image memory region 62a of the host memory 62. When the image data corresponding to the whole of the inspection target optical member 14 is synthesized in the image memory region 62a, the CPU 60 successively copies a part of the image data in the image memory region 62a corresponding to predetermined angle to the first work memory region 62b. Whenever copying the partial image data for predetermined angle to the first work memory region 62b, the CPU 60 detects the position of an edge image or a flange image in the copied partial image data and determines an inspection target region in the image data stored in the image memory region 62a for the angle range corresponding to the copied partial image data, based on the detected position of the edge image or flange image. When whole of inspection target region within the image data stored in the image memory region 62a is determined, the CPU 60 decides the quality of the inspection target optical member 14 through an image-processing on the determined inspection target region within the image data. Furthermore, the CPU 60 outputs an instruction for making the motor driving circuit 63 supply a driving current to the driving motor 8 synchronously with transferring of the image data from the frame memory 61.

<Principle of defective factor detection>

In the optical-member inspection apparatus constructed as described above, the light which could be incident upon each pixel of the CCD line sensor 5 after passing through the imaging lens 4 would be derived from principal ray(s) of light travelling along the optical axis 1 of the imaging lens 4 and which passes between the marginal ray lines m, m shown in FIG. 6. If these marginal ray lines m, m are extended in a reverse direction towards the illumination lamp 1, these marginal ray lines m, m intersect each other where the surface of the inspection target optical member 14 is and then spread toward the diffusion plate 2. On the diffusion plate 2, these marginal ray lines m, m are shielded by the light shielding plate 9. Thus, as shown in FIG. 6, if there is no optical defect in the imaging target region of the inspection target optical member 14 (that is, no defect in the region optically conjugate with the light receiving surface of the pixel row of the CCD line sensor 5), light will in fact not be incident upon each pixel of the CCD line sensor 5.

More specifically, a light ray n, which diffuses around the side of the light shielding plate 9 on the surface of the diffusion plate 2, is transmitted through the imaging target region of the inspection target optical member 14, but passes outside the marginal ray lines m, m and, for this reason, the light ray n is not incident upon the imaging lens 4.

A light ray which diffuses around the side of the light shielding plate 9 on the surface of the diffusion plate 2 and which is transmitted through a portion other than the imaging target region of the inspection target optical member 14, may be incident upon the imaging lens 4, but is not converged on each pixel of the CCD line sensor 5. Therefore, image data output from the CCD line sensor 5 represents an entire area of a dark image. However, if rotational position of the holder 15 is where inside of any one of notch 15a is included in the imaging target region, the light being incident on edge (that is, lateral face) of the inspection target optical member 14 diffuses at the edge. Therefore, the image of the edge (that is, edge image) is formed on the imaging plane of the CCD line sensor 5. Similarly, if rotational position of the holder 15 is where any one of inward flange member 152 is included in the imaging target region, the light being incident on the inward flange member 152 diffuses in or on the inward flange member 152. Therefore, an image of the inward flange is formed on the imaging plane of the CCD line sensor 5.

Figure 7:
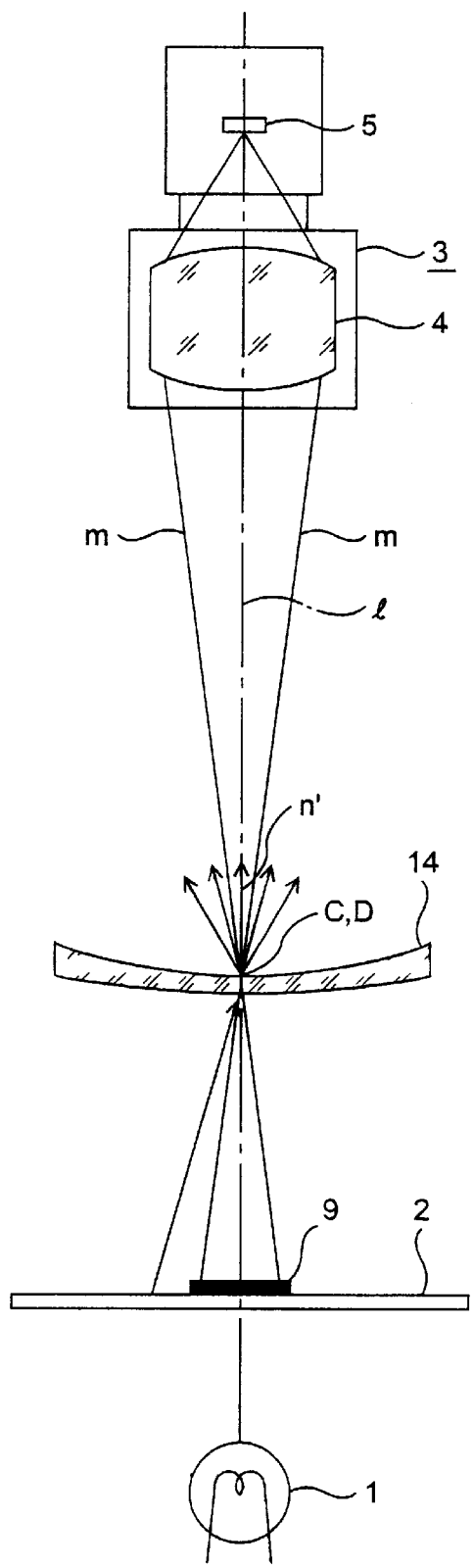
FIG. 7 is an illustration showing advance of light in a state that an inspection target optical member has a defective factor.

On the contrary, as shown in FIGS. 2 and 7, in the case where there is a scratch C and/or dust D in the imaging target region on the surface of the inspection target optical member 14, when a light ray n diffuses around the side of the light shielding plate 9 on the surface of the diffusion plate 2 and impinges on scratch C and/or dust D, the light n is diffused by scratch C and/or dust D. In this case, a diffused light ray n' can diverge at the point of intersection of the marginal ray lines m, m so that a part of the diffused light n' can be incident upon each pixel of the CCD line sensor 5 via the imaging lens 4. Thus, an image of scratch C and/or D (i.e., an image brighter than a periphery) is formed on the imaging surface of the CCD line sensor 5.

Picking-up of an image by the CCD line sensor 5 (that is, electric-charge accumulation and scanning) is performed synchronously with the rotation of the inspection target optical member 14 by the driving motor 8, more specifically, whenever the inspection target optical member 14 rotates by a predetermined angle. Whenever picking-up of an image is performed by the CCD line sensor 5, linear image data is written in the frame memory 61 of the controller 6 and transferred to the image memory region 62a of the host memory 62. Thus, as the inspection target optical member 14 rotates, the linear image data picked up by the image pickup device 3 is successively written into each row of the image memory region 62a sequentially from the head row thereof.

Figure 8:
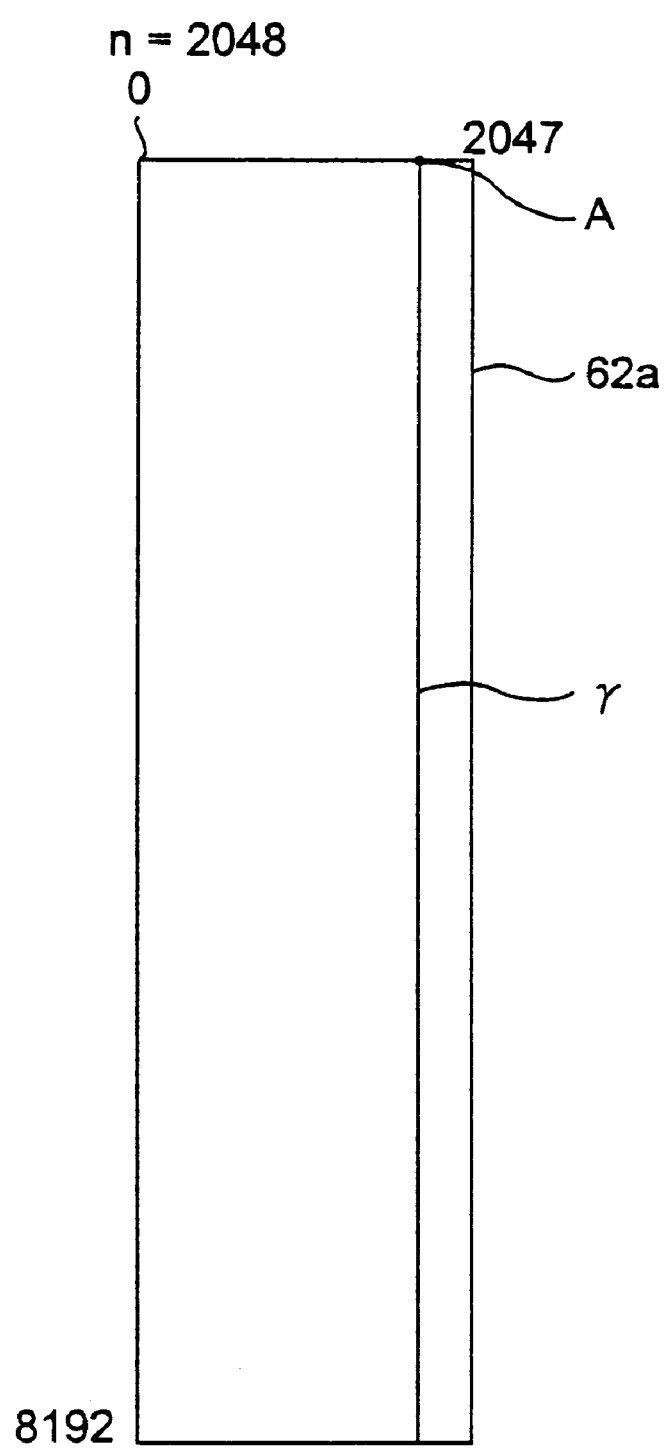
FIG. 8 is an illustration of image data.
Figure 9:
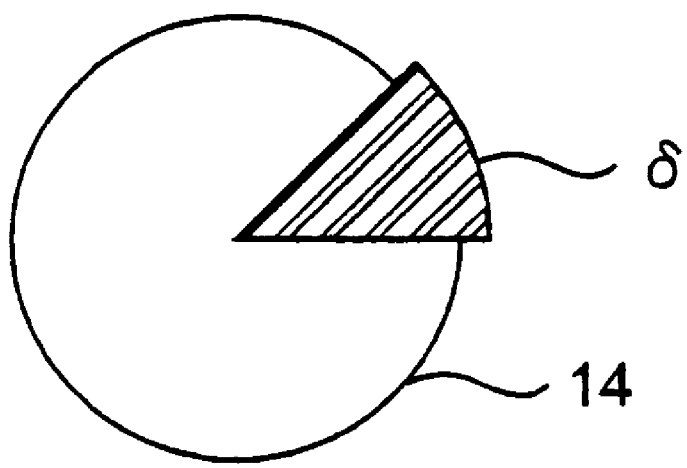
FIG. 9 is an illustration of a sectorial region of the optical member.

FIG. 8 conceptually shows the image data stored in the image memory region 62a of the host memory 62 at the time when the inspection target optical member 14 rotates 360°. The abscissa (that is, x-axis) of the image data shows distance on a radius from the center (that is, optical axis) O of the inspection target optical member 14 and the ordinate (that is, y-axis) of the image data shows the central angle of the radius of the inspection target optical member 14 on the basis of the radius from the center O to the point A shown in FIG. 2. Thus, a coordinate system of the image data is a polar coordinate system. Inside a position γ corresponding to the outer border of the inspection target optical member 14 in the image data of FIG. 8, edge image of the edge (that is, lateral face) of the inspection target optical member 14 is formed at a position whose value of the ordinate corresponds to the notch 15a of the holder 15 and the flange image of the inward flange portion 152 is formed at a position whose value of ordinate corresponds to the inward flange portion 152 of the holder 15. The CPU 60 determines the inspection target region within the image date stored in the image memory region 62a so that the edge image and flange image are excluded in accordance with a method to be described later and rewrites the brightness value of pixels out of the inspection target region in the image data to "0" corresponding to black. Then, the CPU 60 executes coordinate transformation (that is, polar coordinate-orthogonal coordinate transformation) to the image data in polar coordinate system stored in the image memory region 62*a* and writes the image data in orthogonal coordinate system obtained through the transformation into the second work memory region 62*c*. If the image data is thus transformed into the orthogonal coordinate system, a region corresponding to a defective factor in the image data shows an analogous shape having dimension of a predetermined ratio to an actual defective factor in the inspection target optical member 14. Therefore, the CPU 60 extracts the image of a defective factor from the image data in orthogonal coordinate system stored in the second work memory region 62*c*, digitizes the graphic characteristic value of the extracted defective factor (e.g. area or fillet diameter of the defective factor), and thereby decides whether the inspection target optical member 14 is a non-defective or defective product in accordance with whether the digitized graphic characteristic value exceeds a decision threshold value prepared for each graphic characteristic value. For example, when the sum of dimension of all defective factors exceeds a predetermined criterion value, or when the CPU 60 detects even one defective factor having a fillet diameter exceeding a criterion value, the CPU 60 decides that the inspection target optical member 14 is a defective product.

<Method for determining inspection target region>

Then, a method for determining an inspection target region within the image data in polar coordinate system obtained by picking up the inspection target optical member 14 will be described below by referring to FIGS. 9 through 12.

Figure 10:
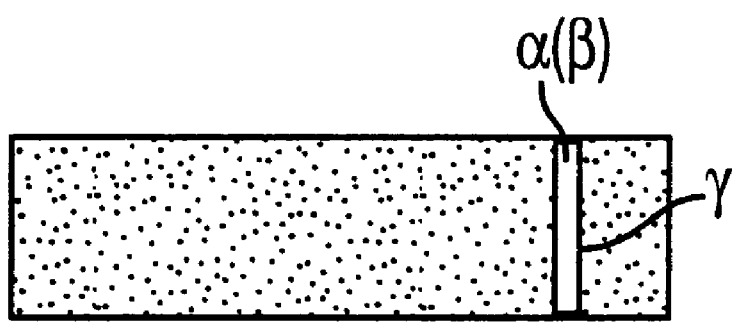
FIG. 10 is an illustration of partial image data.

The CPU 60 cuts out part of the image data stored in the image memory region 62*a* shown in FIG. 8 by a predetermined width in the y-axis direction as shown in FIG. 10 to copy the cut out data to the first work memory region 62*b*. The partial image data thus cut out corresponds to a sectorial region δ of a predetermined central angle of the inspection target optical member 14 shown in FIG. 9. Therefore, a flange image α or an edge image β having a predetermined width is imaged inside of the position γ corresponding to the outer border of the inspection target optical member 14 in the partial image data in parallel with the y-axis so as to run through the partial image data.

The CPU 60 executes x-axis projection to the partial image data stored in the first work memory region 62*b*. That is, the CPU 60 generates x-axis projection data showing the distribution of the sum of brightness values of pixels arranged in the y-axis direction along with the x-axis direction by integrating brightness values of each pixel consisting the partial image data in the y-axis projection data generation based on the partial image data obtained by picking up a sectorial region including the inward flange portion 152. Similarly, the graph shown in FIG. 12 is the x-axis projection data generated based on the partial image data obtained by picking up a sectorial region including inside of the notch 15*a* of the holder 15.

Figure 11:
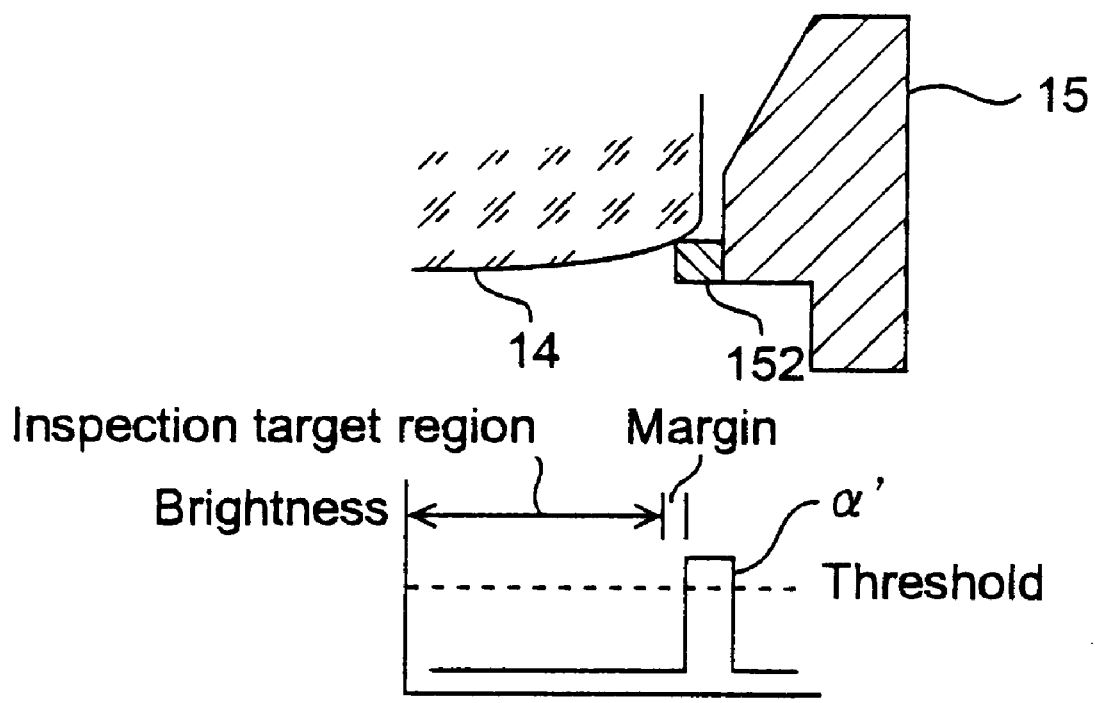
FIG. 11 is a graph showing x-axis projection data based on partial image data corresponding to an inward flange portion.
Figure 12:
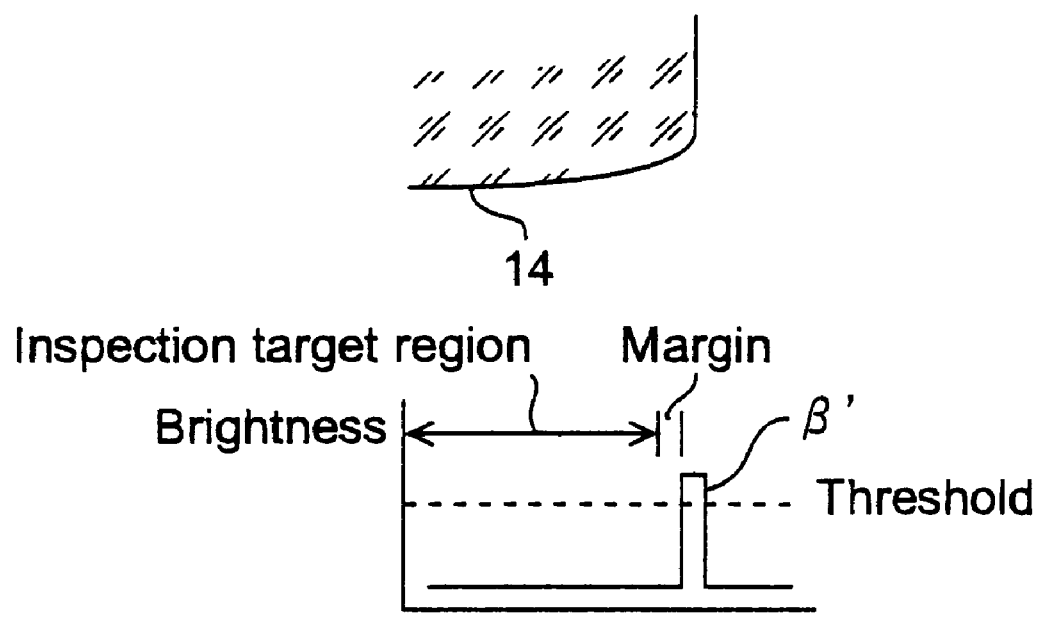
FIG. 12 is a graph showing x-axis projection data based on partial image data corresponding to a notch.

Because the edge image β is imaged so as to run through the partial image data in parallel with the y-axis, the sum β' of brightness values corresponding to the edge image β in the x-axis projection data becomes sufficiently near the maximum value as shown in FIG. 12. Similarly, because the flange image α is imaged so as to run through the partial image data in parallel with the y-axis, the sum α' of brightness values corresponding to the flange image α relatively increases as shown in FIG. 11. Because the diffused light at the inward flange member 152 is transmitted light in contrast to the diffused light at the edge being reflected light, the flange image α is darker than the edge image β and therefore, the sum α of brightness values is slightly smaller than the sum β' of brightness values. However, even if a bright portion (defective-factor image) due to a defective factor is formed in the partial image data, the sum of brightness values corresponding to a defective factor is smaller enough than the sum α of brightness values corresponding to the flange image α and the sum β of brightness values corresponding to the edge image β because such a defective-factor image is surrounded by dark pixels which shows a normal portion.

Accordingly, the CPU 60, as shown in FIGS. 11 and 12, previously sets a decision threshold to a value slightly smaller than the sum of α of brightness values corresponding to the flange image α and detects a portion where the sum of brightness values exceeds the decision threshold in the x-axis projection data as the position of the flange image α or edge image β. Specifically, the CPU 60 scans values of each sum constituting the x-axis projection data from the sum at the center toward the sum at the border to search sum having value having to or larger than the threshold. Then, the CPU 60 detects value of the ordinate corresponding to the sum first detected through the above scanning by assuming that the value of the ordinate corresponding to the first detected sum in the x-axis projection data is coincident with the value of the ordinate corresponding to the center side of the flange image α or edge image β in the partial image data copied to the first work memory region 62*b*. Then, The CPU 60 determines the region between a position shifted toward the center side by predetermined margin from the position of which vale of ordinate is coincident with the detected value and the position corresponding to the center of the inspection target optical member 14 as an inspection target region within the partial image data stored in the first work memory region 62*b*.

The CPU 60 executes the processing for determining the inspection target region described above for all partial image data cut out of the image data stored in the image memory region 62*a*. As a result, an inspection target region is dynamically determined over the entire image data stored in the image memory region 62*a* along the y-axis direction.

<Operation of embodiment>

According to this embodiment constructed as described above, an operator first holds the lateral face (that is, edge) of the inspection target optional member 14 with his or her thumb and forefinger (or further with his or her middle finger) to mount the optical member 14 in the holder 15. In this case, the operator inserts each finger holding the edge of the inspection target optical member 14 into each notch 15*a* of the holder 15. As a result, the optical axis of the inspection target optical member 14 is naturally aligned with the axis of a holder 15. Therefore, the operator lowers the inspection target optical member 14 toward the inward flange portion 152 while keeping the above state, then the inspection target optical member 14 enters the small-diameter cylindrical area 151*b* without colliding against the inside of the cylindrical member 151 of the holder 15 and it is mounted on the inward flange member 152.

Even if the optical axis of the inspection target optical member 14 is shifted from the central axis O of the holder 15 when the operator inserts each finger holding the lateral face (that is, edge) of the inspection target optical member 14 into each notch 15*a*, the inspection target optical member 14 is guided so that the optical axis thereof may be coaxial with the center axis O of the holder 15 because the lateral face (that is, edge) of the inspection target optical member 14 contacts the inside of the tapered area 151a of the holder 15 while the operator lowers the inspection target optical member 14 toward the inward flange member 152. As a result, the inspection target optical member 14 finally enters the small-diameter cylindrical area 151b and it is mounted on the inward flange portion 152. In this case, the inward flange portion 152 of the holder 15 securely holds the inspection target optical member 14 regardless of the edge thickness of the inspection target optical member 14 because the inspection target optical member 14 is mounted on the flange portion 152.

After mounting the inspection target optical member 14 on the holder 15 in the above manner, the operator turns on the illumination lamp 1, image pickup device 3 and controller 6. As a result, image pickup is performed as described above, an inspection target region is extracted from the image data obtained through the image pickup in accordance with positions of the flange image α and edge image β, and the quality of the inspection target optical member 14 is decided, based on the image data in the inspection target region.

Figure 17:
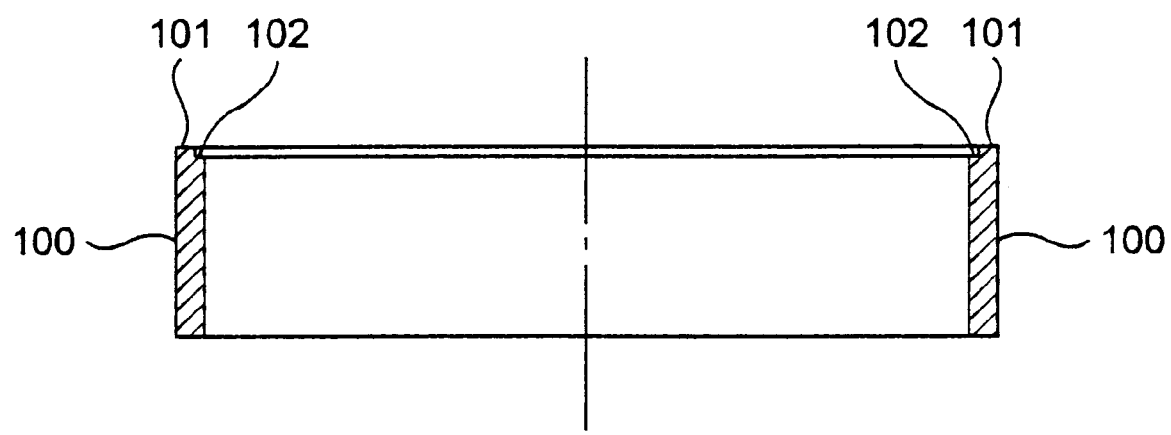
FIG. 17 is a longitudinal sectional view of a conventional holder.
Figure 18:
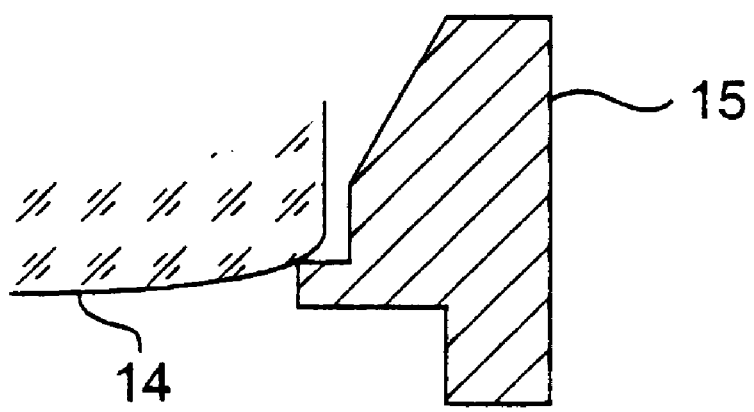
FIG. 18 is a graph showing x-axis projection data if a conventional holder is used.
Figure 18:
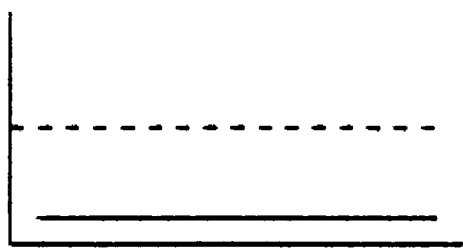

As for this embodiment, the inward flange portion 152 of the holder 15 for mounting the inspection target optical member 14 is made of a diffusion transparent plate. Therefore, a bright image (that is, flange image α) corresponding to the inward flange portion 152 as well as a bright image (that is, edge image β) corresponding to the edge of the inspection target optical member 14 is formed at a position corresponding to the outer border of the inspection target optical member 14 in the image data. As a result, a bright portion is formed in every position (that is, over the whole circumference of the inspection target optical member 14) in the image data corresponding to the outer border of the inspection target optical member 14. Therefore, it is possible to easily and accurately specify a region corresponding to the inspection target optical member 14 in the image data, thereby to accurately and easily decide the quality. On the contrary, if whole of the holder 15 including an inward flange had been made of an opaque material as prior one shown in FIG. 17, the portion corresponding to the outer border of the inspection target optical member 14 would have kept dark, as shown in FIG. 18. As a result, even if generating x-axis projection data and comparing it with a decision threshold, it would have been impossible to specify a portion corresponding to the outer border of the inspection target optical member 14. Therefore, quality decision would have tend to be inaccurate.

Second Embodiment

<Structure of optical-member inspection apparatus>

Figure 13:
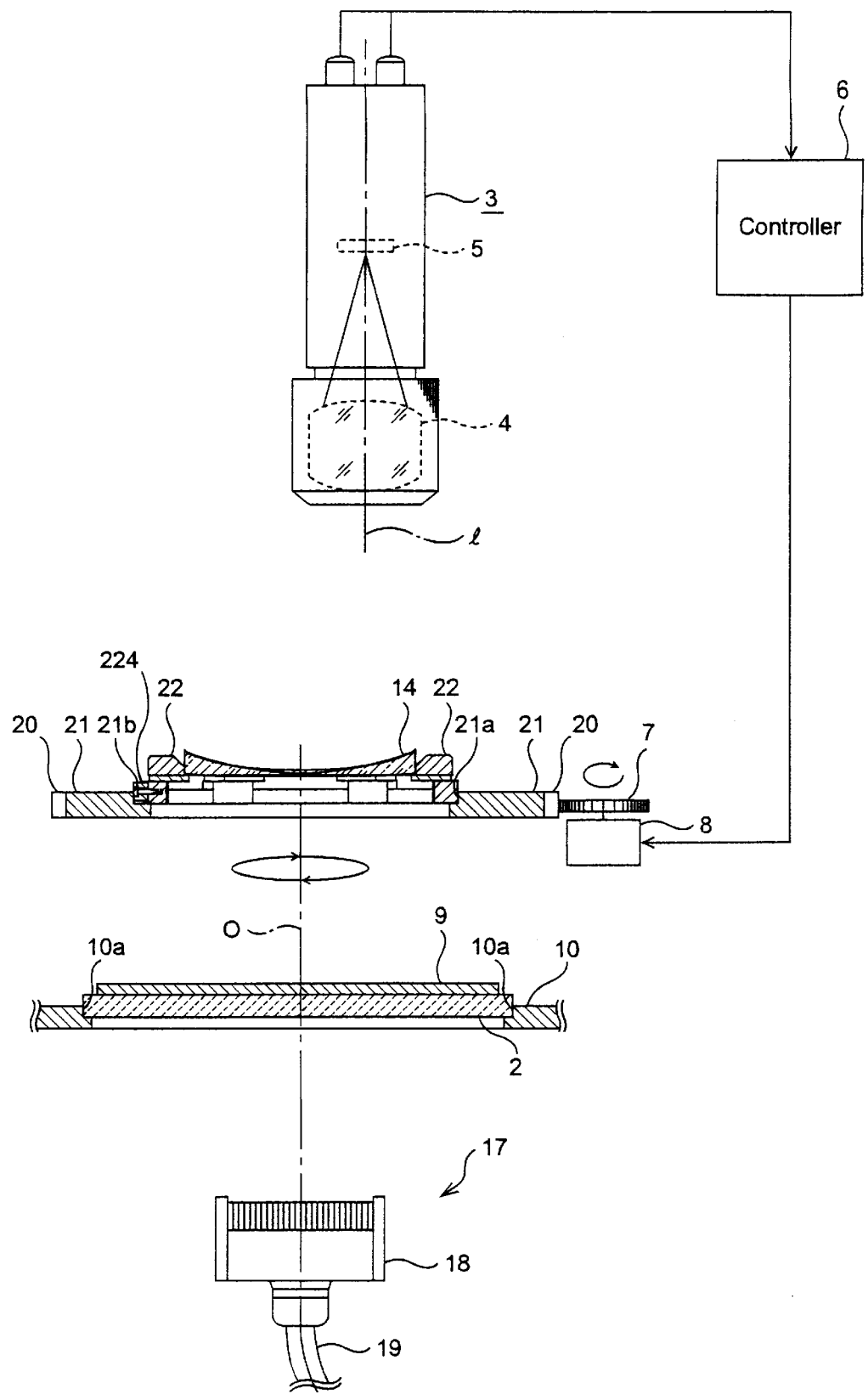
FIG. 13 is a sectional view schematically showing an optical-member inspection apparatus according to a second embodiment of the present invention.

FIG. 13 is a sectional view showing a schematic structure of the optical-member inspection apparatus of the second embodiment of the present invention. As shown in FIG. 13, the optical-member inspection apparatus of the second embodiment is different from the first embodiment in the configuration of a holder 22 and in that a diffusion plate 2 is set coaxially with the holder 22 and a light source 17 including a light guide fiber bundle 19 is used instead of the white lamp 1. However, the second embodiment has the same structure as the first embodiment in other point. Therefore, description of the same structure as the first embodiment will be omitted.

The proximal end of the above light guide fiber bundle 19 is connected to a unillustrated illumination lamp to guide the light emitted from the illumination lamp to the distal end thereof. A light distribution portion 18 is set to the distal end of the light guide fiber bundle 19. In the light distribution portion 18, front ends of fibers are arranged in the horizontal direction of FIG. 13 in parallel with the light-shielding plate 9 on the diffusion plate 2 and a CCD line sensor 5 in an image pickup device 3. The center of the light distribution portion 18 is aligned with the central axis O of the holder 22, as well as, the central axis of the diffusion plate 2. Therefore, it is possible to efficiently illuminate both the sides of the light-shielding portion 9 on the diffusion plate 2.

Through the configuration of the diffusion plate 2 and light-shielding plate 9 is completely same as the configuration of those of the first embodiment, the diameter is larger enough than the outside diameter of the inspection target optical member 14 held by the holder 22. Therefore, the image pickup range by the image pickup device 3 is superimposed with the light-shielding plate 9 over the entire region. Thus, as long as the inspection target-optical member 14 does not have any shape defect, there is no light entering the CCD line sensor 5 of the image pickup device 3 (excluding diffused light at the edge of the inspection target optical member 14 or the receiving member 222 of the holder 22).

The holder 22 for holding the inspection target optical member (which is a lens as for this embodiment) 14 in its internal space is set on a turntable 21 which is rotatably attached to a unillustrated frame of the optical member inspection apparatus. More minutely, the turntable 21 has an annular shape about a rotation axis O coaxial with the central axis of the diffusion transparent plate 2 and is attached to the unillustrated frame so as to be rotatable about the rotation axis O. An annular gear 20 is fitted to the outer periphery of the turntable 21. The annular gear 20 engages with a pinion gear 7 fixed to the driving shaft of a driving motor 8 which is controlled by the controller 6. The holder 22 is removably fitted to a through-hole 21a formed at the center of the turntable 21. Upper half of the through-hole 21a adjacent to the light source 17 has a diameter slightly smaller than the outside diameter of the holder 22 and lower half adjacent to the image pickup device side has a diameter almost equal to the outside diameter of the holder 22. The holder 22 is secured to a step portion formed at boundary between the two halves in the through-hole 21a. Moreover, a notch 21b with which the key 224 of the holder 22 engages is formed on a part of the light source-side opening of the through-hole 21a. The relative rotation between the turntable 21 and the holder 22 is prevented by the engagement between the notch 21b and the key 224. Therefore, when the driving motor 8 rotates its driving shaft, the turntable 21 is rotated through both the gears 7 and 20 and the holder 22 and the inspection target optical member 14 held by the holder 22 are rotated in a plane perpendicular to the optical axis 1.

Then, the specific structure of the above holder 22 is described below by referring to FIGS. 14 to 16. FIG. 14 is a plane view of the holder 22, FIG. 16 is a bottom view of the holder 22, and FIG. 15 is a longitudinal sectional view of the holder 22, taken along the line XV—XV on FIG. 14.

Figure 15:
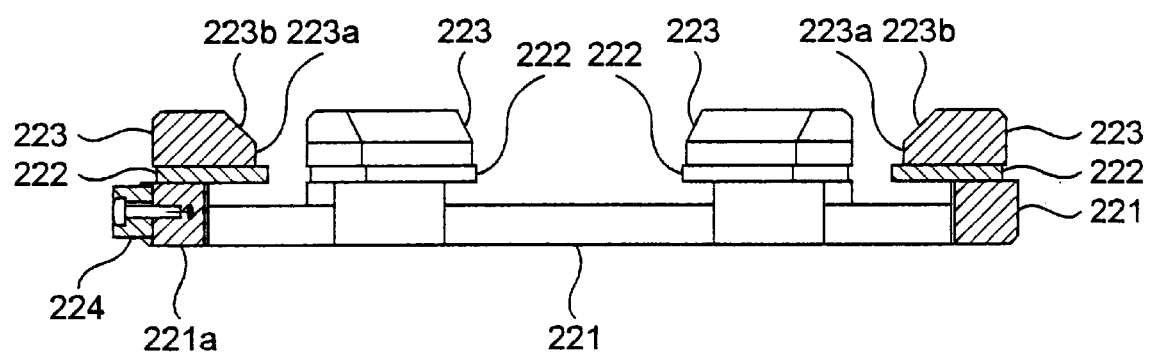
FIG. 15 is a longitudinal sectional view of the holder of FIG. 14, taken along the line XV—XV on FIG. 14.

As shown in FIG. 15, the holder 22 is constructed by stacking receiving members 222 and guide pieces 223 in order on a base member 221 and screwing them one another.

Figure 16:
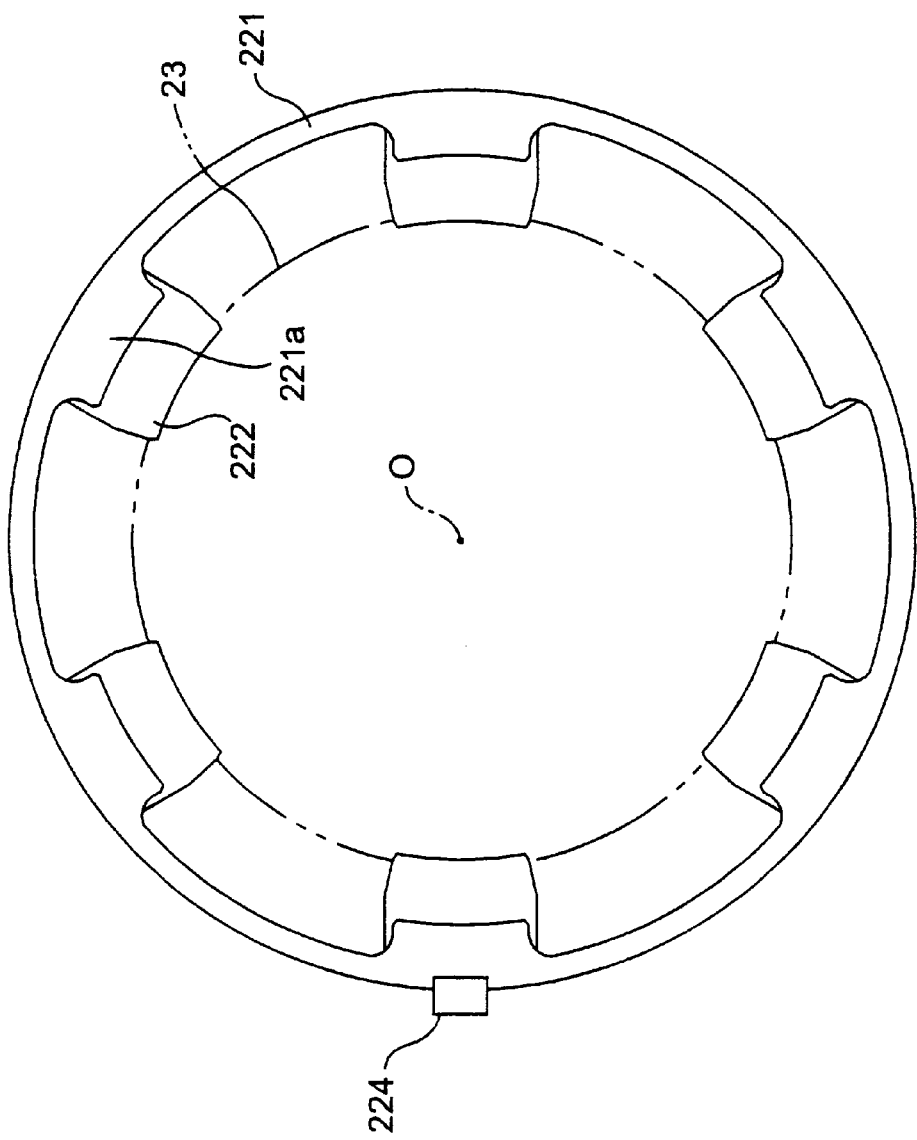
FIG. 16 is a bottom view of a holder.

The base member (that is, base portion) 221, as shown in FIGS. 14 and 16, has an generally ring shape which has a thickness of 5 mm and whose longitudinal cross section is rectangular. More specifically, six protrusions 221a are integrally formed inside of the base member 221 at equal angle of 60° about its center axis O. Each protrusion 221a has plane shape of substantial trapezoid and protrudes by approx. 5 mm toward the center O of the base member 221 and moreover protrudes to the image pickup device side (upward) by approx. 3 mm in parallel and flatly as shown in FIG. 15. The base member 221 has an outside diameter of 110 mm.

Each receiving member 222 made of a diffusion transparent material is mounted on each protrusion 221a of the base member 221 constituted as described above. Each receiving member 222 has a flat shape slightly wider than the protrusion 221a, and its inside edge at side of the center axis O is formed in circular arc of which center of curvature is on the center axis O and of which radius of curvature is slightly (1 mm) smaller than the outer edge (which is shown by a two-dot chain line in FIG. 14) of the inspection target optical member (that is, a lens) 14 held by the holder 12. In this case, because a circular lens having an outside diameter of 80 mm is assumed as the inspection target optical member 14, the radius of curvature of the inside edge of each receiving member 222 is 39 mm. The width of the receiving member 222 in the circumferential direction is slightly larger than the width of the protrusion 221a but it decreases toward the center axis O in the vicinity of the center axis-O side.

Each guide piece 223 has a thickness of 7 mm and is mounted on each receiving member 222 configured as described above. The inside surface of each guide piece 223 at side of the center axis O is formed in circular arc having a diameter almost equal to (or slightly larger than) the outer margin of the inspection target optical member (that is, a lens) 14 held by the holder 22. Specifically, the area on the inside surface of each guide piece 223 from the lower edge contacting the receiving member 222 up to a height of 3 mm is formed as a cylindrical area 223a of which center of curvature is coaxial with the center axis O. Moreover, the remaining area on the inside surface of each guide piece 223 is formed as a tapered area (that is, slope) 223b like a tapered face of which vertex is on the center axis O of the holder 22 and of which generating line intersects the center axis O at 45°. The radial width of the tapered portion 223b is 4 mm on the plane shown in FIG. 14. The portion of the receiving member 222 protruding toward the center axis O from the inside surface of the guide piece 223 serves as receiving face and the width of the protruding portion is 1 mm.

The receiving members 222 and the guide pieces 223 thus stacked are secured to the protrusion 221a of the holder 22 with two fixing screws 224, 224 which pass through the guide pieces 223 and receiving members 222 from the upper side of the guide pieces 223 and screwed into the protrusion 221a. Each set of the receiving member 222 and the guide piece 223 consists optical-member holding portions provided for the base member 221 separately from each other so as to enclose the space formed in the base member 221 to store the inspection target optical member 14.

A rectangular-parallelepiped key 224 is screwed to one portion on the outer periphery of the base member 221, which prevents relative rotation of the holder 22 to the turntable 21 by engaging with a key way 21b formed on inside of the through-hole 21a of the turntable 21.

<Operation of embodiment>

According to this embodiment constructed as described above, an operator first holds the lateral face (that is, edge) of the inspection target optical member 24 with his or her thumb and forefinger (or moreover with his or her middle finger) to mount the inspection target optical member 14 on the holder 22. In this case, the operator inserts the fingers holding the edge of the inspection target optical member 14 into space between the guide pieces 223 adjacent to each other. As a result, the optical axis of the inspected target optical member 14 is naturally aligned with the center axis O of the holder 22. Therefore, the operator lowers the inspection target optical member 14 toward the receiving member 222 under the above state, then the inspection target optical member 14 enters the space enclosed by the cylindrical area 223a of the guide pieces 223 without colliding against the tapered portion 223b of each guide piece 223 and is mounted on the receiving member 222.

Even if the optical axis of the inspection target optical member 14 is shifted from the center axis O of the holder 22 when the operator inserts each finger holding the lateral face (that is, edge) of the inspection target optical member 14 into the space between the guide pieces 223, the inspection target optical member 14 is guided so that the optical axis becomes coaxial with the center axis O of the holder 22 because the lateral face (that is, edge) of the inspection target optical member 14 contacts the inside of the tapered area 223b of the guide piece 223 while the operator lowers the inspection target optical member 14 toward the receiving member 222. As a result, the inspection target optical member 14 enters the space enclosed by the cylindrical area 223a of the guide pieces 223 and is mounted on the receiving member 222.

Thus, by using the holder 22 of this embodiment, the probability that the inspection target optical member 14 collides against the upper end of the holder 22 and is damaged when the inspection target optical member 14 is set to the holder 22 is reduced.

After mounting the inspection target optical member 14 on the holder 22, the operator makes illumination light emitted from the light distribution portion 18 of the light source 17. As a result, as described above, image pickup is performed by the CCD line sensor 15 of the image pickup device 3 and the image data obtained through the image pickup is stored in the frame memory 61 of the controller 6. The above image pickup is performed whenever the inspection target optical member 14 is rotated together with the holder 22 on the turntable 21 every predetermined angle. Then, the controller 6 decides the quality of the inspection target optical member 14 in accordance with the image data accumulated in the image memory region 62a while the inspection target optical member 14 rotates 360°.

When the above image pickup is performed, the edge of the inspection target optical member 14 and the protrusion portion of the receiving member 222 diffuses illumination light, so that they are imaged in the image data as bright images. Therefore, the controller 6 extracts as inspection target region similarly to the case of the first embodiment, based on these bright images and decides the quality of the inspection target optical member 14 in accordance with the image data in the extracted inspection target region.

To remove the inspection target optical member 14 from the holder 22 after inspection, the operator inserts his or her fingers into space between the guide pieces 223 of the holder 22 adjacent to each other to hold the lateral face of the inspection target optical member 14 held by the holder 22. Then, under the above state, the operator extracts the inspection target optical member 14 from the cylindrical area 223a of the guide pieces 223. Thus, the holder 22 of this embodiment makes it possible to accurately and quickly set or remove the inspection target optical member 14 to or from the holder 22 without damaging the inspection target optical member 14 regardless of the thickness of the lateral face of the inspection target optical member 14.

An optical-member inspection apparatus and a holder of the present invention constructed as described above make it possible to securely hold an inspection target optical member regardless of the thickness of the lateral face of the inspection target optical member and moreover, securely form an image showing the outer border of the inspection target optical member in picture shown by image data.

FIG. 1
6 Controller
FIG. 5
3 Image pickup device
8 Driving motor
61 Frame memory 62 Host memory
62a Image memory region
62b First work memory region
62c Second work memory region
62d Image-processing program region
63 Motor driving circuit
FIG. 8
1 8192
FIG. 12
1 Brightness
2 Inspection target region
3 Margin
4 Threshold
FIG. 18
1 Brightness
2 Threshold
FIG 11
1 Brightness
2 Inspection target region
3 Margin
4 Threshold
FIG. 13
6 Controller

What is claimed:

1. A holder for holding an outer margin of an optical member, comprising:
    a cylindrical enclosure portion having an inside width larger than an outside width of the optical member; and
    a protrusion made of a diffusion transparent member, the protrusion restricting movement of the optical member in the enclosure portion by contacting the outer margin of the optical member;
    an inside of said enclosure portion having a shape in which large inside diameter portions and small inside diameter portions are alternately repeated along a circumferential direction, and
    a plurality of protrusions protrude from the small-inside-diameter portions inside of the enclosure portion.

2. The optical-member inspection apparatus according to claim 1, wherein said base portion is made of an opaque material.

3. A holder for holding an outer margin of an optical member, comprising:
    a frame shaped base portion; and
    a plurality of spaced optical-member holding portions provided to the base portion so as to enclose a space for supporting the optical member formed in the base portion, each of said optical-member holding portions having a receiving face on which the outer margin of the optical member is mounted and a restriction wall to restrict movement of the optical member mounted on the receiving face by contacting the outer margin of the optical member, said receiving face contacting the outer margin of a face of the optical member through which light passes during operation of the optical member, said restricting wall being located above said receiving face.

4. The holder according to claim 3, wherein a surface that tilts towards an outside of the holder in a direction away from the receiving face is formed on each of the optical-member holding portions, said surface being intermediate said restriction wall at the side spaced from the receiving face.

5. The holder according to claim 4, wherein
    said restriction wall on each of the optical-member holding portions comprises a cylindrical face having a common center axis,
    an inner edge of said receiving face on each of the optical-member holding portions comprising a circular arc having a center of curvature on said common center axis, and
    said surface on each of the optical-member holding portions is formed as a tapered face having a vertex on the common center axis.

6. The holder according to claim 5, wherein
    said base portion comprises an annular shape about the common center axis.

7. An optical-member inspection apparatus for obtaining image data used for inspections by applying illumination light to an optical member from one side thereof and photographing the same optical member from the other side, comprising:
    a holder comprising a frame shaped base portion and a plurality of spaced optical-member holding portions provided on the base portion so as to enclose a space for supporting the optical member formed in the base portion, each of said optical-member holding portions having a receiving face on which the outer margin of the optical member is mounted and a restriction wall to restrict movement of the optical member mounted on the receiving face by contacting the outer margin of the optical member, said receiving face contacting the outer margin of a face of the optical member through which light passes during operation of the optical member, said restricting wall being located above said moving face.

8. The optical member inspection apparatus according to claim 7, each of said plurality of optical-member holding portions comprising a diffusion transparent member.

9. The optical-member inspection apparatus according to claim 8, wherein each of said plurality of optical member holding portions comprises a protrusion that protrudes from an inside of the base portion.

10. The optical-member inspection apparatus according to claim 9, wherein an inside of said base portion forms a cylindrical face, and
    said protrusions protrude from the inside of the enclosure portion along a circular arc.

11. The holder according to claim 3, each of said plurality of optical-member holding portions comprising a diffusion transparent member.

12. The holder according to claim 11, wherein each of said plurality of optical member holding portions comprises a protrusion that protrudes from an inside of the base portion.

13. The holder according to claim 11, wherein said base portion comprises an enclosure portion that is made of an opaque material.

14. The holder according to claim 11, wherein an inside of said base portion forms a cylindrical face, and said plurality of optical member holding portions comprises protrusions that protrude from an inside of the base portion along a circular arc.

15. The holder according to claim 11, wherein said base portion is a cylindrical member.

* * * * *